United States Patent [19]

Schanin

[11] Patent Number: 5,004,969
[45] Date of Patent: Apr. 2, 1991

[54] PHASE CONTROL SWITCHING CIRCUIT WITHOUT ZERO CROSSING DETECTION

[75] Inventor: David J. Schanin, Carlos, Calif.

[73] Assignee: Bayview Technology Group, Inc., San Carlos, Calif.

[21] Appl. No.: 422,396

[22] Filed: Oct. 16, 1989

[51] Int. Cl.$^5$ ............................................. G05F 1/445
[52] U.S. Cl. .................................. 323/235; 323/244; 323/319; 323/320; 307/584
[58] Field of Search ............... 323/235, 237, 319, 320, 323/244, 300; 315/194; 307/571, 584, 647, 644, 645; 318/DIG. 4, DIG. 7

[56] References Cited

U.S. PATENT DOCUMENTS

| | | | |
|---|---|---|---|
| 4,086,526 | 4/1978 | Grudelbach | 323/319 |
| 4,479,175 | 10/1984 | Gille et al. | 363/159 |
| 4,528,494 | 7/1985 | Bloomer | 323/237 |
| 4,567,425 | 1/1986 | Bloomer | 323/237 |
| 4,617,508 | 10/1986 | Bloomer | 323/237 |
| 4,649,302 | 3/1987 | Damiano et al. | 307/584 |
| 4,680,490 | 7/1987 | Baker et al. | 323/235 |
| 4,823,069 | 4/1989 | Callahan et al. | 315/194 |
| 4,904,906 | 2/1990 | Atherton et al. | 315/DIG. 4 |

FOREIGN PATENT DOCUMENTS 165121 12/1985 European Pat. Off. ............ 307/584

Primary Examiner—William H. Beha, Jr.
Attorney, Agent, or Firm—Anderson & Hirsch

[57] ABSTRACT

A method and circuit for reverse phase control of alternating current being delivered to a load are disclosed wherein voltage-controlled semiconductor switches, such as MOSFET's and IGBT's, are used as electronic switches to conduct voltage during the leading edge of the AC voltage cycle and conduction is terminated when the desired phase angle of the current flow has been reached. The disclosed method and circuit eliminate the need for zero crossing detection of the AC waveform and ensure that the voltage-controlled switches are always turned on before the zero crossing thereby minimizing radiated interference and incandescent lamp hum. The method used is primarily digital in nature making mechanical input or electronic input for the power control equally efficient to implement.

14 Claims, 3 Drawing Sheets

PHASE CONTROL SWITCHING CIRCUIT WITHOUT ZERO CROSSING DETECTION

FIELD OF THE INVENTION

The present invention generally relates to voltage controlling electrical circuits. In particular, the invention relates to a new and improved circuit and method for phase control of Alternating Current voltage to any AC powered device.

BACKGROUND OF THE INVENTION

There are many applications giving rise to the need to control the voltage to an electrical load powered by an alternating current voltage source. One such application is phase-controlling dimmer switches which are used in conjunction with incandescent lighting to vary the intensity of light provided. Known systems typically utilize electronic switches such as silicon-controlled rectifiers (SCR's) or TRIAC's to limit the phase angle conduction of AC voltage to a controlled AC load. It is this process that is known as phase control.

It is well known to implement phase control to a load from an AC circuit in this manner by using electronic switches that turn "on" to a conductive condition at a pre-selected time delay after the zero crossing of the AC periodic wave form and then commute "off" to a blocking condition at the next zero crossing of the waveform when the current through the devices decays to zero. This method of conventional or "forward" phase control is required due to TRIAC's and SCR's ability to be turned on by applying a gate pulse, whereas they can only be turned "off" when the current they are conducting is removed. A disadvantage to forward phase control however, is that the load current undergoes a dramatic rise over a relatively small time interval (di/dt) when the switching device is turned "on" to conduction. This is due to the almost instantaneous application of up to 172 volts (peak voltage in a 120 volt RMS system) across the load.

In the case of an incandescent lamp, this surge in current through the lamp filament will create an intense magnetic field which will cause the filament and its supports to change their length. This change is known as magnetostriction and can shake the entire lamp. It is this phenomenon which is known as incandescent lamp "hum" and when either the incandescent lamp is of a high enough wattage or is placed in an environment with very low ambient sound can produce an audible sound that is unacceptable. In addition this large di/dt can cause Radio Frequency Interference which interferes with audio equipment and AM radio reception. Clearly, this too, is unacceptable.

To minimize the effects of this dramatic increase in current and voltage over such a short period of time, circuits have been developed which use current chokes to limit the current rise to acceptable levels. One such current choke used by manufacturers is to place a large inductor in series with the load. The inductor can then limit the rate of change of current passing through the load and reduce the electromagnetic interference. In the case of an incandescent lamp, an inductor can decrease lamp "hum".

A problem with this practice, however, is that since the inductor is placed in series with the load, it carries the entire load current. As a result, the inductor serves to detract power from the load. Typically, the voltage drop across the inductor can be as much as several volts. Other problems are that the inductors themselves can produce audible noise from their cores, as well as heat, they are physically large, and they are relatively expensive.

More recent systems developed to afford reverse phase control, use pairs of voltage-controlled devices such as metal-oxide-semiconductor field-effect-transistor switches (MOSFET's) and insulated-gate bipolar transistors (IGBT's). These devices have the ability to be either turned "on" or "off" through control of their gate voltage. These devices, therefore, are typically configured using reverse phase control, whereby these devices do not delay turn on into the AC half-cycle but enable conduction immediately following zero-crossing of the AC line during the leading edge of the AC cycle and are turned "off" after some predetermined time, but before the next zero-crossing In this manner, these devices significantly reduce di/dt to an acceptable level at turn-on. Turn "off" di/dt, however, must still be controlled. Toward this end various methods and circuits have been disclosed in U.S. Pat. Nos. 4,540,893, 4,547,828, 4,823,069, and 4,528,494 which serve to reduce di/dt and incandescent lamp hum at turn "off".

All of these known circuits, however, rely on essentially the same method for enabling the voltage-controlled switches. That is, except for U.S. Pat. No. 4,823,069, the references teach treating the pair of switches as one unit, developing a zero-crossing detection mechanism, enabling the switches ostensibly at zero-crossing of the AC waveform, and terminating conduction after same pre-defined time interval. While U.S. Pat. No. 4,823,069 does not teach treating the switch unit, since redundant circuitry is employed for each switch, each switch is still enabled following some defined interval after zero-crossing.

The most prevalent problem associated with these prior art methods of reverse phase control is that of accurate zero-crossing detection which is crucial to the goal of minimal noise and interference generation. If the voltage controlled switches in a zero-crossing detection circuit are not enabled based on an accurately detected zero-crossing, the switches will serve to generate additional electromagnetic interference and incandescent lamp hum which are precisely the phenomena that the circuit is designed to prohibit.

While some known circuits, such as that disclosed in U.S. Pat. No. 4,823,069 employ controlled rise time circuitry to address this problem, the circuitry adds complexity and, inevitably, expense, to the circuit. Additionally, the additional energy absorbed by the controlled rise time circuitry will be dissipated as heat. These complicated circuits still do not address, however, the problem of inaccurately determined zero-crossing detection leading to an erratic phase angle of conduction of the voltage controlled switches. This inevitably leads to instability in the output voltage of the entire system.

Various phenomena contribute to the difficulty of accurate zero-crossing detection. One such factor is that as the waveform of the line voltage approaches zero, any line noise can disturb accurate detection of a zero voltage condition. This problem is particularly germane in commercial environments. While known mechanisms such as filters and damping networks could be used to minimize ambient noise, such solutions would also serve to delay zero crossing detection and thereby resulting in the problems discussed above. Another problem associated with zero-crossing detection is that due to its analog nature, comparators, diodes, and various other analog components are required. These components will add cost and complexity to a system and often require a pulse shaping device, such as that taught by U.S. Pat. No. 4,528,494 in order to interface with any other digital components of the circuit.

It is therefore an object of the present invention to provide a method and circuit for reverse phase control which eliminates the need for accurate zero crossing detection.

It is another object of the present invention to provide a method and circuit for controlling the conduction period of two voltage controlled switches by operating the switches in an inverse fashion.

It is yet another object of the present invention to provide a novel approach to the use of a reliable, stable triggering mechanism for a time base to measure conduction phase angle.

It is still another object of the present invention to provide a method and circuit for reverse phase angle control which can be easily incorporated into digitally controlled or microcontroller controlled applications.

SUMMARY OF THE INVENTION

The problems of the prior art are greatly alleviated by the system of the present invention which is a method and switching circuit for phase control, preferably reverse phase control, of current passing through a load from an AC source without the need for zero-crossing detection of the voltage waveform. In so doing, the present invention is able to eliminate the inaccuracies of prior art devices which are zero-crossing detection based.

In accordance with the present invention, there are provided voltage control devices as reverse phase control switches. While the use of such devices is known, in accordance with the present invention inverse series connected switches, such as MOSFET's, are controlled in an inverse fashion with relation to one another. In this manner, the present invention is able to provide a circuit that begins conduction at zero-crossing without the need for detecting zero-crossing.

The circuit of the present invention includes a variable delay element and a flip flop for controlling the conduction periods of the switches. When the proper conduction phase angle has been reached as determined by the variable delay element, the flip-flop is triggered to disable the conduction MOSFET and to enable the blocking MOSFET. The blocking MOSFET, however, will be in its reverse bias mode at this time and conducting through its body diode. When the AC cycle passes through the zero-crossing and the direction of current flow reverses, therefore, the previously blocking MOSFET will begin conducting with no lag behind the zero-crossing because it is already enabled. As a result, turn-on at zero-crossing of the voltage waveform is inherent in the design of the present invention without the need for zero-crossing detection. Further provided is initialization circuitry which ensures that the flip-flop is in proper state immediately after power-up for the whole system.

While zero-crossing detection is not required by the system in accordance with the invention, a stable and consistent timing signal is required from which the varying phase angle of conduction of the switches can be measured and controlled by the variable delay element. Such a signal can be generated in many different ways by those skilled in the art and does not, therefore, constitute a part of this invention. For purposes of illustration, however, a typical means for generating the required timing signal is discussed in the description that follows. It is merely important to recognize, that by allowing the time base signal to be independent of the zero-crossing of the voltage waveform, the present invention allows the signal to be buffered and conditioned in order avoid erratic operation of the system. Also discussed below is a typical power supply for the system of the present invention.

DETAILED DESCRIPTION OF PREFERRED EMBODIMENTS

At the outset the invention is described in its broadest overall aspects with a more detailed description following. In its broadest aspects the present invention is a reverse phase control power switching circuit and method for controlling the flow of current through a load from an AC source. The circuit includes a pair of inversely connected series voltage controlled power switching devices which are controlled by a flip flop to ensure that one switch is always in conducting mode and that one switch is always in blocking mode.

Figure 1:
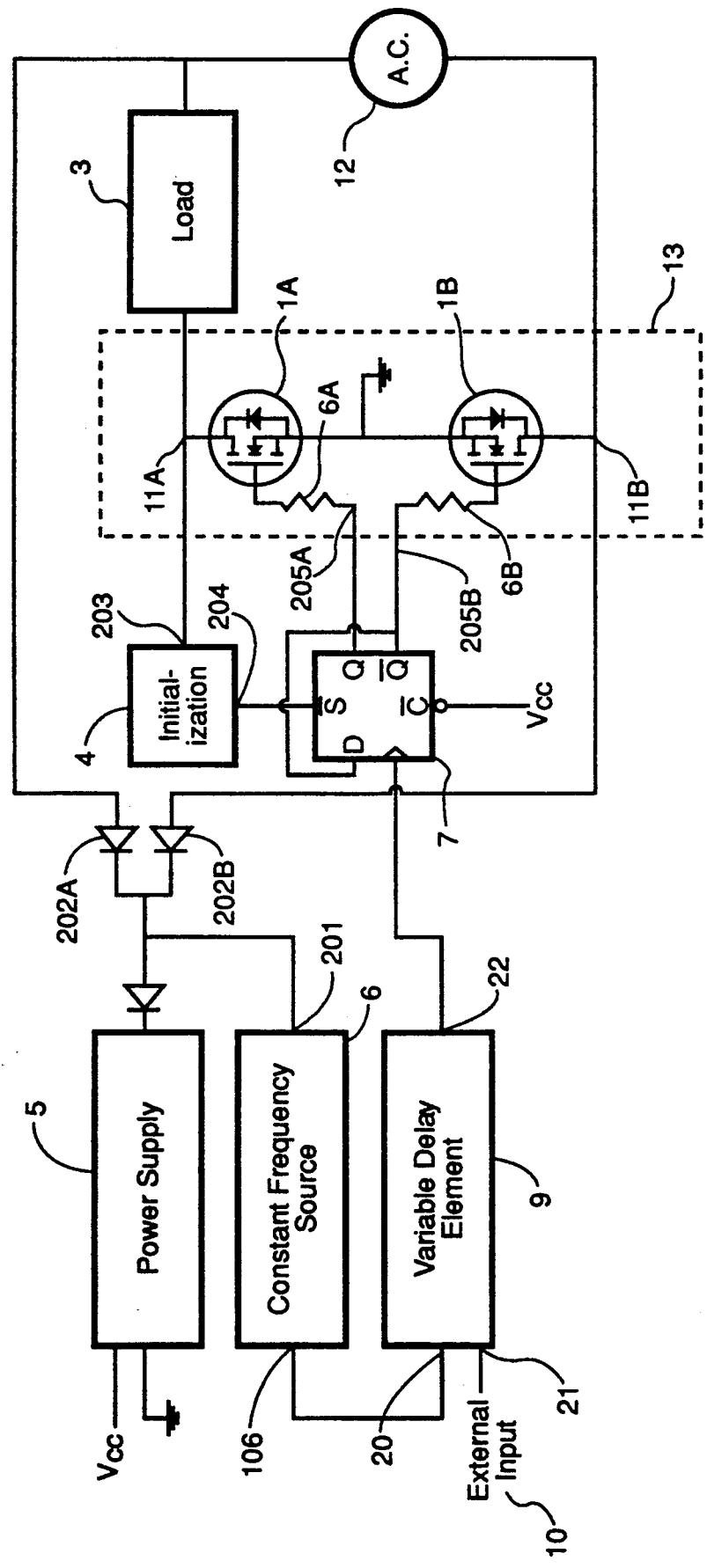
FIG. 1 is a schematic block diagram of a reverse phase control circuit in accordance with the present invention.

As shown in FIG. 1, in accordance with the invention a load 3 is connected to an AC power source 12 through a pair of power switching devices 1A and 1B, such as MOSFET's or IGBT's, which are inversely connected to one another in series. The conductive state of the switching devices IA and IB is controlled by a flip flop 7 which is toggled by a constant frequency source 6. Before reaching the flip-flop 7, however, the signal generated by the constant frequency source 6 is delayed by a variable delay element 9 which is in turn controlled by an external input 10.

The interaction between constant frequency source 6, flip-flop 7, and delay element 9 forms the basis of this invention. For the purpose of understanding the invention, assume that the AC waveform has passed through the zero-crossing, and that flip-flop 7 is in a state such that Q is the one state (at or near $V_{cc}$), and therefore −Q is in the zero state (at or near ground). MOSFET 11A is therefore conducting in its forward direction, and MOSFET 11B is conducting in the reverse direction through its body diode. When the point is reached in the AC cycle where the desired power for the current cycle has been conducted (as measured by reaching the proper angle of conduction), flip-flop 7 is clocked by variable delay element 9. The Q output of flip-flop 7 goes to zero state, driving point 205A to zero, removing the gate voltage from MOSFET 11A, and therefore forward biased MOSFET 11A ceases to conduct. The load will therefore no longer have voltage across it. Output −Q of flip-flop 7 goes to the one state, applying gate voltage is to MOSFET 11B. Since MOSFET 11B is reverse biased, however, it continues to conduct only through its body diode (as part of the full wave rectifier used by power supply 5 and described below) until the current reverses itself at the next zero-crossing. Once the next zero-crossing occurs, MOSFET 11B will conduct immediately, since its gate has already been enabled by flip-flop 7 and it will become forward biased. In a similar fashion, MOSFET 11B will become reverse biased and will immediately begin conduction through its body diode. The cycle now repeats itself as described above.

The constant frequency source 6 provides a constant and reliable time base operating at the frequency of the AC input voltage. The variable delay element 9 accepts this time base as input at signal 20. If no external input 10 is provided to the variable delay element 9, then this delay element delays the constant frequency source 6 only long enough to align the delay element's output with the minimum conduction angle designed for. This minimum conduction angle, which may be zero, is set by resister 30 in FIG. 6. This minimum setting delay will trigger flip-flop 7 to reverse the gate voltage at or near the zero-crossing, resulting in little or no conducted voltage. If external input 10 demands additional power, the variable delay element 9 increases the delay between the time base input at point 20, and the variable delay element's output at point 22. This will cause an additional delay before the gates of the MOSFET 11A and 11B are reversed, allowing a larger phase angle of conduction. It is in this manner that the present invention is able to control its switch devices with respect to zero-crossing of the voltage without actually detecting that zero-crossing. This process can also be understood by examining FIGS. 2 and 3, discussed in greater detail below.

Resistors 6A and 6B are provided to limit the current passing through the switching devices 1A and 1B and to thereby reduce the turn off time in response to the flip-flop 7. This reduced current also serves to minimize electromagnetic interference generated by the system.

An initialization means 4 is provided to deliver an initialization signal via line 204 to the flip-flop 7 to ensure that at power-up flip-flop 7 is in the correct state. Further provided are diodes 202A and 202B which, in conjunction with the integral body diodes of the switching devices 1A and 1B, provide full wave rectified Direct Current to a power supply 5. The power supply 5 provides $V_{cc}$ to power the logic of the circuit.

Figure 2:
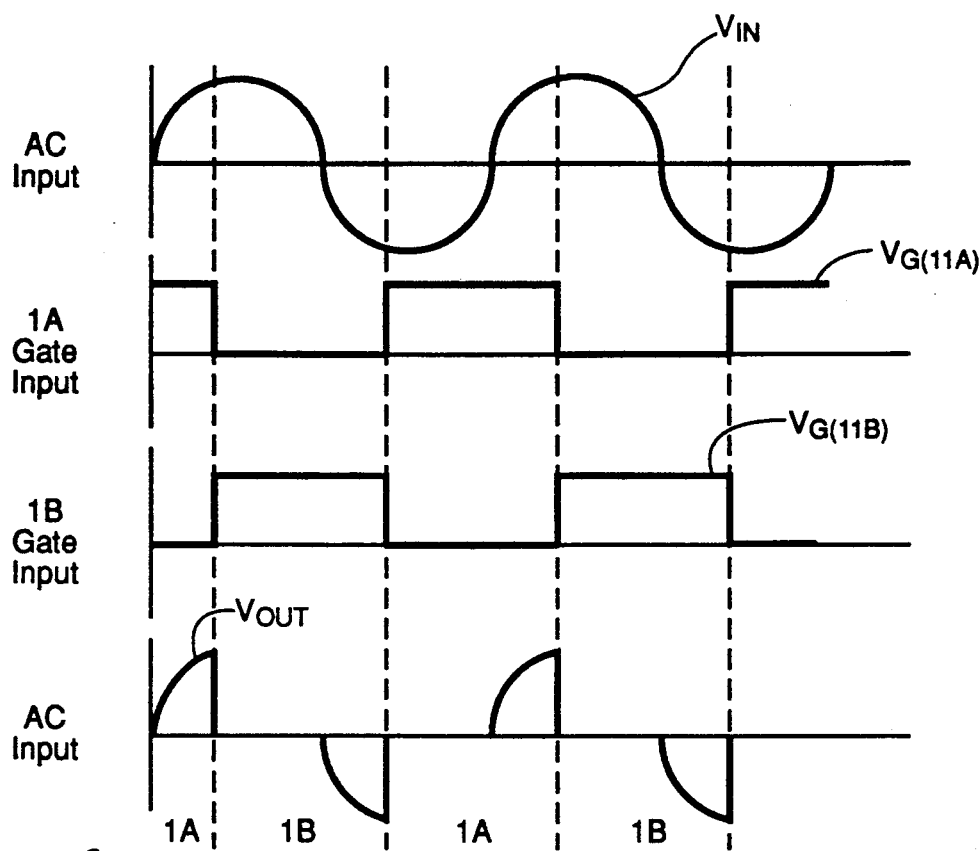
FIG. 2 is a series of timing diagrams pertaining to the load voltage and current obtained with the reverse phase control circuit of the present invention during operation for low conduction angles when a low amount of power is conducted.
Figure 3:
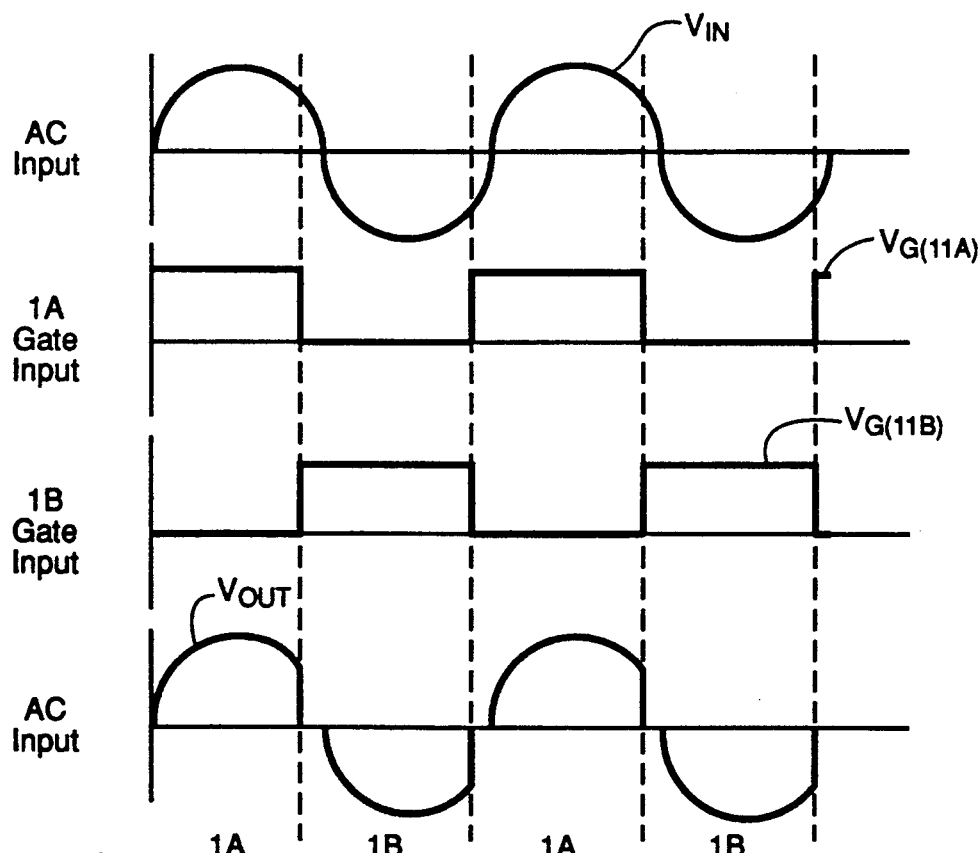
FIG. 3 is a series of timing diagrams pertaining to the load voltage and current obtained with the reverse phase control circuit of the present invention during operation at large phase angles when a large amount of power is conducted.

FIGS. 2 and 3 are timing diagrams for various waveforms which are used and generated by the circuit of the present invention. Line $V_{in}$ is a representation of the sinusoidal waveform being input to the power switching mechanism 13 by the AC source 12. Lines $V_{G(11A)}$ and $V_{G(11B)}$ represent the "on" or "off" signal being delivered from the flip-flop 7 to the input gates 205A and 205B of the power switching devices 13. As is clearly evident from the figures, the signals sent from the flip-flop 7 to the inputs 205A and 205B are exact opposites of one another and ensure that there is always one switching device in an "on" mode and one switching device in an "off" mode. Line $V_{out}$ is a representation of the AC output which is delivered to the load 3.

FIG. 2 illustrates operation for low conduction angles during which a low amount of power is being conducted. Toward this end, it is clear in the figure that the switching of the power switching devices occurs relatively quickly after the zero-crossing of the AC input waveform $V_{in}$. This is due to the variable delay element 9 causing a relatively short delay between the constant frequency source 6 and the flip-flop 7. This is further reflected in the fact that the line $V_{out}$ representing AC output depicts comparatively short bursts of conduction. FIG. 3, on the other hand, illustrates conduction at large phase angles when a high amount of power is conducted. This is due to the variable delay element 9 causing a long delay between the constant frequency source 6 and the flip-flop 7. With comparison to FIG. 2, it is clear that the signals during large phase angle conduction are shifted differently and show switching a relatively long period after zero-crossing. Accordingly, the AC output as represented by line $V_{out}$ shows conductivity over a greater period of time.

Figure 4:
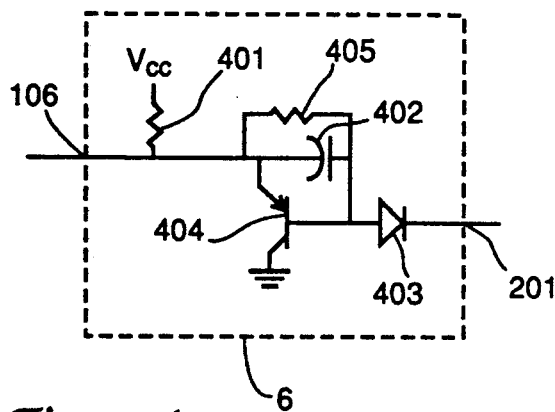
FIG. 4 is a schematic representation of a typical constant frequency source for use in conjunction with the reverse phase control circuit of the present invention.

FIG. 4 represents a typical embodiment of the constant frequency source 6 used in conjunction with the present invention. The constant frequency source 6 includes a transistor 404 which does not conduct as long as the input voltage at 201 is higher than two diode drops from $V_{cc}$. Were the contrary true, diode 403 would be in reverse bias modes thereby eliminating any base current. A resistor 401 serves as a pull-up to $V_{cc}$ ensuring that signal 106 is near or at $V_{cc}$ while the transistor 404 is not conducting.

When the output voltage at line 201 of the constant frequency source 6 drops two diode drops below $V_{cc}$, as would happen at the beginning and end of the full wave rectified DC that is supplied to 201 as discussed above, the diode 403 will become forward biased and begin to conduct. This supplies base current to the transistor 404 and causes it to conduct. Signal 106 will thereby be brought near ground which will create a time base pulse representing a constant frequency. A capacitor 402 and a resistor 405 serve as noise filters for the constant frequency source 6.

Figure 5:
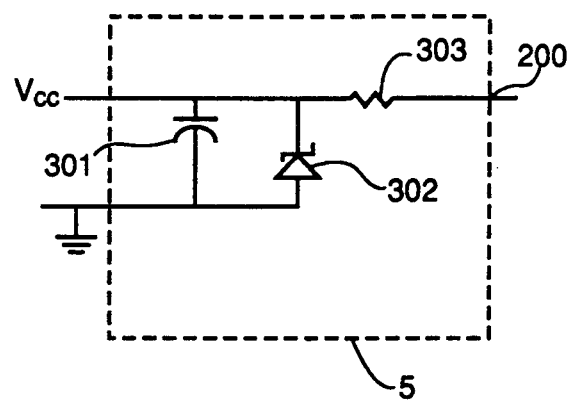
FIG. 5 is a schematic representation of a typical power supply source for use in conjunction with the reverse phase control circuit of the present invention.

FIG. 5 shows a typical power supply circuit for use with the present invention which utilizes zener diode technology. In the circuit there is a zener diode 302 which uses a resistor 303 to provide a regulated DC voltage to a filter capacitor 301. The filter capacitor is connected across $V_{cc}$ and ground. This $V_{cc}$ is connected to the flip-flop 7 and is used to power the logic of the circuit.

Figure 6:
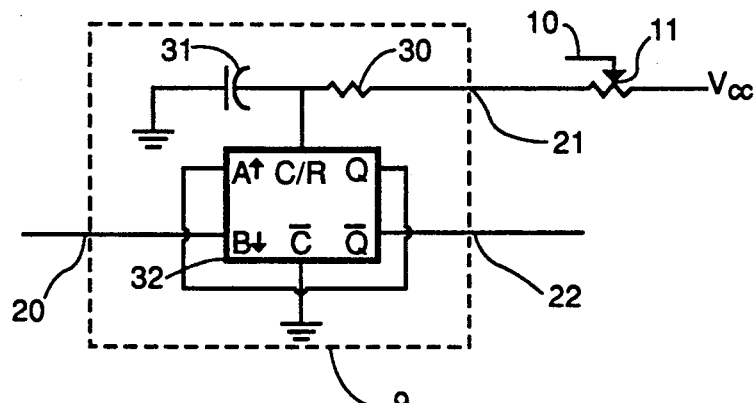
FIG. 6 is a schematic representation of a typical variable delay element for use in conjunction with the reverse phase control circuit of the present invention.

In FIG. 6 there is shown a possible embodiment of the the variable delay element 9 of the present invention. In accordance with this embodiment, a multivibrator 32 is used as the delay device. The multivibrator is triggered by a negative-going signal edge delivered along line 20 by the constant frequency source 6. By utilizing the inverse Q output of the multivibrator 32, the falling edge trigger of line 20 is both delayed and inverted. The resulting signal is then supplied to the clock input of the flip-flop 7 through connecting line 22.

The period of the delay is bounded at the minimum by a resistor 30 and varied through an external input 10 of a variable resistor 11.

In an alternate embodiment of the variable delay element 9, the unit can be micro-controller based to allow for analog or digital load control information to be sampled or received by the microcontroller. This information would then have to be translated into load control which would typically be done by using a programmable hardware timer to delay input 20 to output 22 thereby creating a variable delay function.

Figure 7:
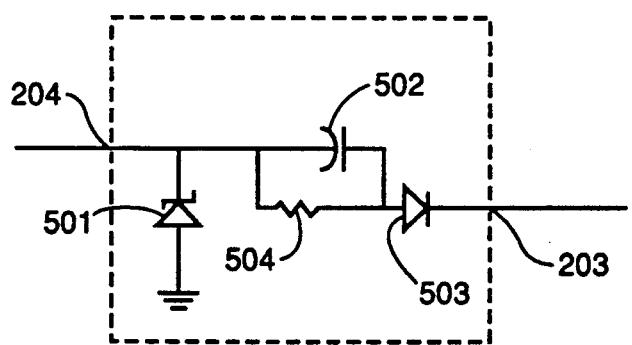
FIG. 7 is a schematic representation of a typical initialization logic circuit for use in conjunction with the reverse phase control circuit of the present invention.

In FIG. 7 there is shown a typical embodiment of the initialization circuitry 4 for the flip-flop 7. In this embodiment, a diode 503, in conjunction with the integral body diode of switching device 1B, forms a half wave rectifier that passes current when switching device 1A is positively biased. During this time period, the flip-flop 7 should be in the set state to ensure that the drive of the flip-flop 7 is set correctly to drive the switching device 1A which is only of concern immediately after power-up. A resistor 504 serves as a current limiter for a zener diode 501 which ensure that the voltage reaching the flip-flop 7 does not exceed the flip-flop's rating. Again, as discussed in earlier circuits, a capacitor 502 serves as a noise filter.

Herein, a switch is "conducting" when current is actually flowing through the switch. Generally, not only must the switch be one, but an electric potential must applied across the switch. In the context of a MOSFET, the gate must be activated and a potential difference must exist between the source and drain. A switch is "conductive" when it is on; in this condition it would be conducting in the presence of the appropriate applied potential. Generally, a switch can be conductive without being conducting, while the reverse is not true. A MOSFET is conductive when a suitable "active" voltage level is applied to its gate, even when no current flows between the source and drain.

A switch is "non-conductive" when it is off. Current will not flow even with a potential difference applied across the switch. A switch is "semiconductive" when current will flow through the switch when an electric potential is applied in one direction, but not in the other. A MOSFET is never non-conductive, due to its inherent diode. It is either conductive or semiconductive.

Like a MOSFET, a switch assembly comprising an IGBT in parallel with a diode can be switched between a conductive and a semiconductive state. The IGBT switches between conductive and nonconductive and a semiconductive states. The parallel diode causes the assembly to be semiconductive when the IGBT is off.

A switch comprising a pair semiconductive-type in inverse series is nonconductive when both switches are semiconductor, i.e., off. The composite switch can be an inverse series pair of IGBTs respectively in parallel with respective diodes, or an inverse series pair or MOSFETs. Such a switch is semiconductive when exactly one of the inverse series components is conductive. The sign of the semiconductive state depends on which of the two MOSFETs or IGBTs is on. When both MOSFETs and IGBTs are conductive, such a switch is conductive.

In accordance with the foregoing, several phase control systems which provide for improved power adjustment for AC systems are presented. In addition, many modifications to and variations upon the described embodiments are provided for by the present invention, the scope of which is limited only by the following claims.

What is claimed is:

1. A phase control power switching circuit for controlling the phase angle of current flow through a load from an alternating current source, said circuit comprising:
   a pair of voltage controlled switches in inverse series connection between said load and said alternating current source for controlling the current flow through said load;
   drive means for driving said voltage controlled switches in an inverse fashion to ensure that one switch is always in a conducting mode and that one switch is always in a non-conducting mode; and
   toggle means for toggling said drive means so that each of said voltage controlled switches alternates between the conducting mode and the non-conducting mode when the phase angle of current flow is determined to be proper.

2. The circuit as set forth in claim 1 wherein said pair of voltage controlled switches are metal-oxide-semiconductor field-effect-transistor switches.

3. The circuit as set forth in claim 1 wherein said pair of voltage controlled switches are insulated gate bipolar transistor switches.

4. A circuit as recited in claim 1 wherein said drive means is a flip-flop logic element.

5. A circuit as recited in claim 1 wherein said toggle means includes a constant frequency source and a variable delay element, said constant frequency source delivering a constant frequency signal corresponding to a full wave rectified direct current equivalent of the current flow from the alternating current source to said variable delay element which toggles said drive means when it determines that the predetermined phase angle of the current flow has been reached.

6. A phase control power switching circuit for controlling the phase angle of current flow through a load from an alternating current source, said circuit comprising:
   a pair of voltage controlled switches in inverse series connection between said load and said alternating current source for controlling the current flow through said load;
   drive means for driving said voltage controlled switches in an inverse fashion to ensure that one switch is always in a conducting mode and that one switch is always in a non-conducting mode;
   a frequency source for generating a constant frequency pulse based on a full wave rectified equivalent of the current flow from the alternating current source; and
   toggles means for toggling said drive means based upon said constant frequency pulse so that each of said voltage controlled switches alternates between the conducting mode and the nonconducting mode when the phase angle of current flow is determined to be proper.

7. A circuit as recited in claim 6 wherein said toggle means includes a variable delay element which determines the phase angle of the current flow based upon the constant frequency pulse and an external input said toggle means toggling said drive means accordingly.

8. The circuit as set forth in claim 6 wherein said pair of voltage controlled switches are metal-oxide-semiconductor field-effect-transistor switches.

9. The circuit as set forth in claim 6 wherein said pair of voltage controlled switches are insulated gate bipolar transistor switches.

10. A circuit as recited in claim 6, wherein said drive means is a flip-flop logic element.

11. A phase control switching circuit comprising:

AC input means for receiving an alternating current signal having positive half-cycle and negative half-cycles;

a switch assembly including first and second switches in inverse series relationship, each of said switches being capable of switching between a conductive state and a semiconductive state, said first switch being arranged so that in its semiconductive state it is conducting during a positive half-cycle, said second switch being arranged so that in its semiconductive state it is conducting during a negative half-cycle, said switch assembly being coupled to said AC input means; and drive means for controlling the state of said switches, said drive means switching said second switch in a first direction from one of its conductive and semiconductive states to the other at a phase of said positive half-cycle selected to achieve a desired RMS power output, said drive means switching said first switch in the opposite direction within said positive half-cycle, said drive means switching said first switch in said first direction at a phase of said negative half-cycle selected to achieve said desired RMS power output, said switching means switching said second switch in said opposite direction within said negative half-cycle.

12. A phase control switching circuit as recited in claim 11 wherein said drive means switches said first switch in said opposite direction at the same time it switches said second switch in said first direction, said drive means switching said second switch in said opposite direction at the same time it switches said first switch in said first direction.

13. A phase control switching circuit as recited in claim 11 wherein said first direction is from said semiconductive state to said conductive state whereby said circuit provides reverse phase control.

14. A method for controlling the phase angle of current flow through a load from an alternating current source using a pair of voltage controlled switches in inverse series arrangement, said method comprising:

supplying full wave rectified direct current based upon the current flow from the alternating current source to a constant frequency source;

generating a constant frequency pulse based upon said full wave rectified direct current;

determining from the constant frequency pulse when the phase angle of the current flow from the alternating current source is proper; and controlling said voltage controlled switches inversely so that one switch is in a conducting mode and one switch is in a non-conducting mode and so that when the phase angle of the current flow is determined to be proper the switch that was conducting becomes non-conducting and the switch that was nonconducting becomes conducting.

* * * * *

UNITED STATES PATENT AND TRADEMARK OFFICE
CERTIFICATE OF CORRECTION

PATENT NO. : 5,004,969

DATED : April 2, 1991

INVENTOR(S) : David J. Schanin

It is certified that error appears in the above-identified patent and that said Letters Patent is hereby corrected as shown below:

In the drawings, Sheet 1, Fig. 1, the set input "$\bar{S}$" of the flip flop 7 should be --C-- and the reset input "$\bar{C}$" of the flip flop 7 should be --$\bar{S}$--. Sheet 3, Fig. 6, the "$\bar{C}$" should be --C--. Sheet 3, Fig. 7, the diode 503 should be reversed. column 4, line 57, "IA and IB" should read --1A and 1B--. Column 7, line 11, "oreating" should read --creating--. In the inventor field, inventor's address "Carlos" should read --San Carlos--.

Signed and Sealed this

First Day of December, 1992

*Attest:*

DOUGLAS B. COMER

*Attesting Officer*     *Acting Commissioner of Patents and Trademarks*